United States Patent [19]

Kitada et al.

[11] Patent Number: 4,808,642
[45] Date of Patent: Feb. 28, 1989

[54] CHLORINE-CONTAINING RESIN MOLDING AND MATERIAL FOR USE THEREWITH

[75] Inventors: Hideki Kitada; Masami Takahashi; Toshiyuki Yagi; Masaaki Sukeda; Tadashi Nakayama, all of Osaka, Japan

[73] Assignee: Takiron Co., Ltd., Osaka, Japan

[21] Appl. No.: 856,683

[22] Filed: Apr. 25, 1986

[30] Foreign Application Priority Data

| Apr. 26, 1985 | [JP] | Japan | 60-91633 |
| Feb. 24, 1986 | [JP] | Japan | 60-38643 |
| Feb. 24, 1986 | [JP] | Japan | 61-38644 |
| Mar. 14, 1986 | [JP] | Japan | 61-57735 |

[51] Int. Cl.$^4$ .................. C08K 5/00; C09D 3/76
[52] U.S. Cl. ............................ 524/87; 523/408; 523/426; 523/455; 524/104; 524/109; 524/237; 524/238; 524/240; 524/523; 524/527
[58] Field of Search .......... 524/238, 237, 240, 109, 524/87, 104, 523, 527; 523/408, 426, 455

[56] References Cited

U.S. PATENT DOCUMENTS

| 3,970,644 | 7/1976 | Hardy et al. | 524/400 |
| 4,116,907 | 9/1978 | Shiohara et al. | 524/385 |
| 4,117,029 | 9/1978 | Kitano | 524/100 |
| 4,252,698 | 2/1981 | Ito et al. | 524/425 |
| 4,276,391 | 6/1981 | Hardt et al. | 525/71 |
| 4,376,843 | 3/1983 | Lindner et al. | 525/83 |
| 4,388,430 | 6/1983 | Fillian et al. | 524/239 |
| 4,515,843 | 5/1985 | Borchaad et al. | 523/174 |
| 4,642,322 | 2/1987 | Wehner et al. | 524/191 |

OTHER PUBLICATIONS

Chem Abs 83-207051(b) 1975, Tsutsunaka Plastics Japan, Kokai, 75-79,548, Jun. 1975.
Chem Abs 88-122802(a) 1978, Born et al., East German 128,256, Nov. 1977.
Chem Abs 91-57923(m) 1979, Mikaelyan Mitov. G. 1979 26(3) 147-9.

*Primary Examiner*—Herbert J. Lilling
*Attorney, Agent, or Firm*—Koda & Androlia

[57] ABSTRACT

This invention relates to a chlorine-containing resin molding characterized by its stabilization by aminocarboxylic acid and from which molding substantially no metallic ion is detected, and to material for use with the chlorine-containing resin molding consisting of 100 parts by weight of chlorine-containing resin and 0.5–5.0 parts by weight of aminocarbolyxic acid. According to the molding and the material for use therewith, there is no possibility of metallic ion dissolving from the molding in which a metallic stabilizer is conventionally used, with the result that the molding finds wide application in the industrial field related with electric parts including a semiconductor as a main item, medical treatment, chemicals and pharmaceuticals, and food stuffs, all subject to adverse effects by dissolution of metallic ion. Consideration for application of a nonmetallic agent is also given to the use of a coloring agent and a lubricant with respect to the molding and the material for use therewith.

8 Claims, No Drawings

CHLORINE-CONTAINING RESIN MOLDING AND MATERIAL FOR USE THEREWITH

BACKGROUND OF THE INVENTION

1. Field of the Invention

This invention relates to a chlorine-containing resin molding, and more particularly to a chlorine-containing resin molding which contains no stabilizer consisting of metallic salts such as plumbum (Pb) or tin (Sn). Further consideration is given to the application of nonmetallic coloring agents and lubricants to the molding. This invention relates further to molding material (composition of matter) for obtaining the molding.

2. Prior Art

Polyvinyl chloride (hereinafter referred to as PVC) representative of chlorine-containing resin is widely used in the form of synthetic resin molding because it is inexpensive, strong and excellent in chemical resistance and secondary processing property. The PVC resin, because of its structural properties, is deprived of hydrochloric acid with H and Cl element freed of PVC by temperatures in time of molding and polyene is formed in the PVC resin, and when the polyene continues to be more than seven atoms, it develops into chromophore and the PVC resin turns light yellow by the chromophore. If the polyene chain of this chromophore is increased in length, the PVC resin turns gradually yellowish brown until finally the brown changes into black. Accordingly, stabilization of PVC resin means, in short, prevention of this change in color, and in other words, it means prevention of production of polyene, namely, suppression of freeing of hydrochloric acid from the PVC resin. From this viewpoint, it is general practice to add a PVC resin stabilizer beforehand to the PVC resin material. It is generally know that stabilizers of metallic compounds including a metallic element such as Pb or Sn are chiefly used as a stabilizer of the type described, and it is also true that the stabilizers are used in chlorine-containing resins other than the PVC resin.

Also, it is general practice to add a so-called lubricant such as higher fatty acid represented by stearic acid to the chlorine-containing resin in order to improve the releasing property of the resin in time of molding and also to improve appearance (especially, luster, gloss or the like) of finished moldings.

As well known, remarkable progress has recently been made in the development of electronic parts with semiconductors as a main item, and synthetic resin moldings have come to be widely used in the equipment for manufacturing the electronic parts, in the packaging containers for the parts, in the housings of the machines and appliances in which the electronic parts are used, and in other related machines and appliances. Such manufacturing equipment requires various kinds of processing in the step of manufacture, and packaging containers, machine and appliance housings require such processing as picking or washing. Accordingly, the PVC resin molding which contains a metallic compound such as Pb or Sn as a stabilizer metallic element ion is dissolved from the resin molding during the processing and produced adverse effects on the electronic parts or like articles manufactured, with the result that it was impossible to use the PVC resin molding as one for use with high-quality semiconductors such as a 1-megabit semiconductor.

Besides, it was a cause of various troubles that metallic ion dissolves from the PVC resin molding which has been widely used in the industrial field related with biochemistry, medical treatment, pharmaceuticals, foodstuff, etc.

Epoxy compounds, organic phosphorous ester, phenol derivatives, polyhydric alcohol, etc. are known as PVC resin stabilizers other than metallic salts, but even if they were used in single, they were not yet sufficient for thermal stabilization, so that they had to be used in combination with the aforestated metallic salts. From the circumstances above, fluororesin excellent in thermal stability as a synthetic resin suitable for the abovementioned purposes is used by some users, but the fluororesin suffers from the disadvantages that it is expensive and is difficult of being subjected to secondary processing such as welding. Because of the disadvantage, the fluororesin lacks wide applicability. Accordingly, there was strong desire for application of chlorine-containing resin free of such a disadvantage to the uses described above.

The aforementioned lubricant was effective for improving moldability but had the disadvantage it reduced thermal deformation temperature (heat softening temperature, heat distortion temperature) and accordingly, measures were also necessary in this respect for making the lubricant suitable for a high temperature use out of the above uses.

Furthermore, in the uses of synthetic resin moldings related with semiconductor items, there are some cases wherein the resin moldings must be opaque or translucent (hereinafter referred to as non-light-transmittability) depending upon the purpose of use. In such a case, a metallic coloring agent such as titanium oxide is beforehand mixed into a resin material and molded. But in the various steps of processing, a metallic element ion dissolves from the moldings colored with a metallic coloring agent and often provided a cause of similar troubles and could not fully meet requirements for colored moldings.

SUMMARY OF THE INVENTION

Accordingly, a primary object of the invention is to provide a molding highly effective for the aforestated uses by making possible thermal stabilization of chlorine-containing resin by the use of an effective stabilizer free from a metallic element such as Pb or Sn.

Another object of the invention is to provide a molding of the type described wherein the thermal stability of the chlorine-containing resin is further improved by using another nonmetallic stabilizer in combination with the stabilizer in the primary object.

Still another object of the invention is to provide a molding of the type described in the first and second objects wherein a nonmetallic coloring agent is used to make the molding non-light-transmittable.

Yet another object of the invention is to provide a molding of the type described with reference to the preceding objects wherein a nonmetallic lubricant is used.

Since the molding of the invention contains no metallic element as a stabilizer, there is no possibility of metallic element ion dissolving from the molding. The invention, however, does not exclude a very small amount of metallic element contained in a molding material itself and/or considered inevitable in the step of molding. Namely, it is possible for the molding of the invention to contain a very small amount of impure metallic element which is contained nonpurposely in the molding material itself for chlorine-containing resin or in the specified coloring agents and lubricant known or to be described later, or a very small amount of such inevitable impure metallic element (about several ppm of various elements) which are involved in or shifted into the moldings from metallic dust moving afloat in the atmosphere in the step of manufacture and from metal-made forming members such as forming rolls, extruder, press. Accordingly, it should be understood that the term "substantially" used in the specification means "exclusive of inevitable metallic elements".

The invention has also for its object the provision of molding materials for obtaining the molding described above.

DETAILED DESCRIPTION OF THE INVENTION

The chlorine-containing resin molding of the invention is a chlorine-containing resin molding characterized by its stabilization by aminocarboxylic ester and is the chlorine-containing resin molding from which substantially no metallic ion is detected. Also, in an attempt to further improve the thermal stability of the chlorine-containing resin molding, the invention is intended to provide not only a chlorine-containing resin stabilized by the aminocarboxylic ester and by epoxy compounds but also a chlorine-containing resin molding having non-light-transmittability imparted thereto by causing the resin to contain as a coloring agent any one or several kinds selected from a denatured acryl modifier agent, acrylonitrile-butadiene-styrene copolymer, methyl methacrylate-butadiene-styrene copolymer, acrylonitrile-acrylate-styrene copolymer, acrylonitrile-polyethylene-polypropylene-styrene copolymer, acrylonitrile-chlorinated polyethylene styrene copolymer, acrylonitrile-styrene copolymer, ethylene vinyl acetate copolymer, fluororesin, chlorinated polyethylene, and carbon black, or a chlorine-containing resin molding having lubrication imparted thereto without lowering thermal deformation temperature by adding an acrylic lubricant to the resin.

By the chlorine-containing resin are meant resins having polyvinyl chloride as a main constituent such as chlorinated polyvinyl chloride resin, ethylenated polyvinyl chloride resin, an alloy of other resins with polyvinyl chloride resin. Various selections may be made of a degree of polymerization of such chlorine-containing resin, and the use of the resin having a low degree of polymerization which permits a low working temperature and does not require heat resistance so much, for example, a mean degree of polymerization of 700–800 provides a wide range of processing and enables the production of high quality moldings. Such a resin of low degree of polymerization is preferably used particularly when it is desired to obtain a transparent molding.

The aminocarboxylic acid used herein is a general term for compounds having an amino group and a carboxylic acid group. Included under the compounds having an amino group are ammonia, urea, acrylonitrile, aminoacetanilide, aminoanthraquinone, aminoethanol, aminoethylene, aminoethylbenzene, aminocresol, amino-phenol, caprolactam, etc. On the other hand, included under the compounds having a carboxylic acid group are butyric acid, caproic acid, lauric acid, palmitic acid, stearic acid, crotonic acid, oleic acid, linolenic acid, naphthoic acid, malonic acid, succinic acid, adipic acid, maleic acid, phthalic acid, etc. Included under the compounds representative of amino-carboxylic acid are acetylglutamic acid, glycine, alanine, pyrrolidonecarboxylic acid, lysine, arginine, tryptophane, anthranilic acid, benzoic acid, β-aminocrotonic acid, α-aminoacrylic acid, α-aminoadipic acid, aminomalonic acid, acetylphenylalanine, acetylmethionine, and an ester compound of the preceding compounds, and an ester compound of acetylamino acid with pentaerythritol or dipentaerythritol, an ester compound of pentaerythritol with 2-pyrrolidone-5-carboxylic acids, etc. Out of the aminocarboxylic esters mentioned below, β-aminocrotonic ester is excellent in thermal stability and is represented by the general formula:

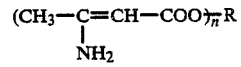

wherein n: 1–6 and R: a residual radical of 1–6 hydric alcohol. Included under concrete example of R—OH)n constituting the above ester are methanol, ethanol, propanol, isopropanol, butanol, 2-ethylhexanol, isooctanol, octanol, isononanol, decanol, lauryl alcohol, myristyl alcohol, palmityl alcohol, stearyl alcohol, ethylene glycol, propylene glycohol, 1,3-butanediol, 1,4-butanediol, 1,6-hexanediol, 1,10-decanediol, diethylene glycol, thio-diethanol, trimethylolpropane, glycerine, tris(2-hydroxyethyl) isocyanurate, triethanolamine, pentaerythritol, ditrimethanol propane, diglycerine, sorbitol, mannitol, xylitol, dipentaerythritol, etc. Condensation polymerization of β-aminocrotonic ester with any one of the preceding alcohols provides β-aminocrotonic ester. Included under preferred examples of the ester are stearyl alcohol β-aminocrotonic ester, 1,4-butanediol di-β-aminocrotonic ester, thio-diethanol di-β-aminocrotonic ester, trimethylol propane tri-β-aminocrotonic ester, pentaerythritol tetra-β-aminocrotonic ester, dipentaerythritol hexa-β-aminocrotonic ester, etc.

Furthermore, included under the epoxy compounds which synergically improve thermal stability in combination with the aminocarboxylic acid are epoxidized compounds such as epoxidized animal-vegetable oil, epoxidized fatty ester, epoxidized alicyclic compound, glycidyl ether or glycidyl ester compound, epoxidized high-molecular compound, etc. Stated more concretely, an epoxidized soybean oil, epoxidized linseed oil, epoxidized safflower oil, epoxidized sunflower oil, epoxidized cotton seed oil, etc. come under the epoxidized animal-vegetable oil; epoxidized butyl stearic acid, epoxidized octyl stearic acid, epoxidized butyl linseed oil fatty acid, etc. come under the epoxidized fatty acid ester; epoxidized tetrahydrophthalic ester (butanol, octanol, decanol, etc. in the form of alcohol) comes under the epoxidized alicyclic compound; glycidyl ether of bisphenol A, glycidyl methacrylate and its copolymer come under the glycidyl ether or glycidyl ester compound; and epoxidized polybutadiene, epoxidized acrylonitrile butadiene rubber, etc. come under the epoxidized high-molecular compound.

Included under the nonmetallic stabilizers which are used in combination with the above-mentioned stabilizers to prevent initial discoloration or guarantee long-time thermal stability are phenol derivatives, polyhydric alcohol, nitrogen-containing compound, sulfur-containing compound and keto compound, hindered phenol, hindered bisphenol, etc. are used as the phenol derivatives; glycerine, mannitol, xylitol, trimethylolpropane, pentaerythritol, sorbitol, polyethylene glycol, sorbitan monolaurylate, glycerine monostearate, partial ester compound with carboxylic acid, nitrogen-containing polyhydric alcohol, sulfur-containing polyhydric alcohol, etc. are used as the polyhydric alcohol; 2-phenyl indole, diphenylthiourea, triazine, etc. are used as the nitrogen-containing compound; thiodi-propionic ester, triazine thiol, thiol carboxylic acid anhydride, etc. are used as the sulfur-containing compound; and acetoacetic ester, dehydroacetic acid, β-diketone, etc. are used as the keto compound.

The aminocarboxylic ester and epoxy compound used in the form of a stabilizer suppress the production of polyene and prevent decoloring of the PVC resin by compensating for HCl which is produced in the resin and accelerate the decomposition of the resin, or by substituting or stabilizing Cl atoms high in reactivity which constitute a cause of decomposition of the PVC resin. These stabilizers are added as the form of a molding material to the chlorine-containing resin in a ratio of 0.5–5.0, preferably, 1.0–3.0 parts by weight (but 0.5–7.0 parts by weight in total) of the stabilizer to 100 parts by weight of the resin to stabilize the resin. The stabilizers are characterized in that they contain no metallic element such Pb or Sn. An adequate amount of the respective stabilizers added to the chlorine-containing resin is as described above, but addition of the stabilizer in amounts not exceeding 0.5 parts by weight cannot provide sufficient thermal stabilization, while on the other hand, addition of the stabilizer in excess of 5.0 parts by weight improves thermal stability to that extent, but is economically unfavorable.

Furthermore, the chlorine-containing resin, in order to have non-light-transmittability imparted thereto, is caused to contain as a coloring agent one or several kinds selected from a denatured acryl modifier agents, ABS resin (acrylonitrile-butadiene-styrene copolymer), MBS resin (methyl methacrylate-butadiene-styrene copolymer), AAS resin (acrylonitrile-acrylate-styrene copolymer), AES resin (acrylonitrile-polyethylene-polypropylene rubber-styrene copolymer) ACS resin (acrylonitrile-chlorinated polyethylene-styrene copolymer), AS resin (acrylonitrile styrene copolymer), EVA resin (ethylene vinyl acetate copolymer), fluororesin, chlorinated polyethylene and carbon black. In this processing, any of the materials other than carbon black may be added to the chlorine-containing resin in a ratio of 0.5–50 parts by weight in total of the material to 100 parts by weight of the resin, while carbon black may be added to the resin in a ratio of 0.01–3.0 parts by weight of the former to the latter. But this amount of addition must be selected depending upon the thickness of a molding to be obtained. Namely, when the intended molding is thick, a small amount of addition can provide non-light-transmittability, but the amount of addition must be increased to secure non-light-transmittability when the molding is thin. Included under the materials used as the denatured acryl modifier out of the materials which impart non-light-transmittability to the chlorine-containing resin are a copolymer of methyl methacrylate with acrylic ester, a polymer of methyl methacrylate after copolymerization of styrene with alkyl acrylate, a copolymer of styrene with acryl acrylate after polymerization of methyl methacrylate, a polymer obtained after polymerization of methyl methacrylate, thereafter polymerization of styrene with alkyl acrylate and finally further polymerization of methyl methacrylate, a polymer obtained by first copolymerization of butadiene, acrylic acid and styrene with one another and thereafter graft polymerization of methyl methacrylate and thereafter polymerization of styrene, and a polymer obtained by copolymerization of butadiene, acrylonitrile and styrene with one another and thereafter polymerization of styrene and thereafter graft polymerization of methyl methacrylate. Included under the fluororesin are tetrafluoroethylene resin, perfluoroalkoxy fluororesin, tetrafluoroethylene-hexafluoropropylene copolymer resin tetrafluoroethylene-ethylene copolymer, trifluoromonochloroethylene resin, difluorovinylidene resin, monofluorovinyl resin, etc.

On the other hand, included under the acrylic lubricant which imparts lubrication to the PVC resin and which does not bring about reduction in thermal deformation temperature are (1) a lubricant in which acrylic ester is copolymerized with methyl methacrylate and a surface active agent is added to the copolymer, (2) a lubricant in which acrylic ester or a mixture of methacrylic acid ester and styrene monomer is copolymerized with methyl methacrylate, and (3) a lubricant in which a surface active agent is added to the copolymer in item 2.

Used as the acrylic ester and methacrylic acid ester mentioned above are methyl methacrylate, ethyl acrylate, n-butyl acrylate, iso-butyl acrylate, 2-hexyl acrylate, chloroethyl acrylate, ethyl methacrylate, n-butyl-methacrylate, n-ethyl hexyl methacrylate, chloroethyl methacrylate etc. And used as the surface agent in Items 1 and 2 are anionic surface active agent, cationic surface active agent, and nonionic surface active agent.

The stabilizers mentioned above are conducive as a chief stabilizer to the thermal stability of the chlorine-containing resin, and the acrylic lubricant imparts lubrication to the resin. On the other hand, it is possible to promote the thermal stability of the chlorine-containing resin and improve the processing property, weather resistance, mechanical property thereof or to plasticize and foam the resin by adding to the resin any other additive containing no metal, for example, an antioxidant such as an aminic, phenolic, sulfuric, phosphoric antioxidant; a photostabilizer such as an ultraviolet absorbent; a plasticizer such as phthalic ester, aromatic carboxylic ester, aliphatic dibasic ester; a reinforcing agent such as ABS, MBS for providing transparency; and an additive such as a pigment, assistant, mold inhibitor, forming agent.

As described above, the chlorine-containing resin molding materials containing the stabilizer, lubricant, coloring agent or additive are molded by a calender, press or extruder into a form as of a plate, sheet, pipe, angle, and welding rod, etc.

EXAMPLES

A description will now be given of the examples below.

(i) Preparation of test pieces (i-1) The molding material of the invention was prepared according to Table 1 on the next page.

TABLE 1

| Material | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Resin | | | | | | | | | | | | | | | | | | |
| PVC resin | 100 | 100 | 100 | 100 | 100 | 100 | 100 | 100 | 100 | 100 | 100 | 100 | 100 | 100 | 100 | 100 | 100 | 100 |
| Stabilizer | | | | | | | | | | | | | | | | | | |
| 1.4 Butanediol di-β-amino-crotonic ester | 2.0 | 0.5 | 1.5 | 3.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Glycidyl ether of bisphenol A | | 1.5 | 1.5 | 1.5 | | | | | | | 1.5 | 1.5 | 1.5 | 1.5 | | 1.5 | 1.5 | 1.5 |
| Glycidyl ester of bisphenol A | | | | | 1.5 | | | | | | | | | | | | | |
| Epoxidized animal-vegetable oil | | | | | | 1.5 | | | | | | | | | | | | |
| Epoxidized fatty ester | | | | | | | 1.5 | | | | | | | | | | | |
| Epoxidized alicyclic compound | | | | | | | | 1.5 | | | | | | | | | | |
| Coloring Agent | | | | | | | | | | | | | | | | | | |
| Denatured acryl modifier agent | | | | | | | | | 10 | | 3 | 10 | 20 | | | 20 | | |
| Ethylene vinyl acetate copolymer | | | | | | | | | | 10 | | | | 20 | | | | 20 |
| Lubricant | | | | | | | | | | | | | | | | | | |
| Acrylic lubricant | | | | | | | | | | | | | | | 2.0 | 2.0 | 2.0 | 2.0 |
| Stearic acid | 1.0 | 1.0 | 1.0 | 0.3 | 1.0 | 1.0 | 1.0 | 1.0 | 1.0 | 1.0 | 1.0 | 1.0 | 1.0 | 1.0 | | | | |
| Polyhydric alcohol | | 1.0 | | 1.0 | | | | | | | | | | | | | | |

Numerical values in the Table 1 represents parts by weight.

(i-2) Five kinds of molding material shown in Table 2 were prepared as contrast examples.

TABLE 2

| Material | Contrast example No. | | | | |
|---|---|---|---|---|---|
| | 1 | 2 | 3 | 4 | 5 |
| Resin | | | | | |
| PVC resin | 100 | 100 | 100 | 100 | 100 |
| Stabilizer | | | | | |
| Glycidyl ether of bisphenol A | 4.0 | | 1.5 | 1.0 | |
| Organic phosphorous ester | | 4.0 | 1.5 | | |
| Tin maleate | | | | 3.0 | 3.0 |
| Lubricant | | | | | |
| Stearic acid | 0.3 | 0.3 | 2.0 | 0.3 | 0.3 |
| Polyhydric alcohol | 1.0 | 1.0 | | | 1.0 |

Numerical values in Table 2 represent parts by weight.

(ii) Measurement of thermal stability

Each of the above test pieces were heat molded by a calender (160° C.×5 minutes) and a press (160° C.×5 minutes) to measure the thermal stability of the respective molding according to change in the color tone of the moldings. The results are shown in Table 3.

TABLE 3

| Test piece | Change in color tone |
|---|---|
| Example 1 | Yellow |
| Example 2 | Light yellow |
| Example 3 | No change |
| Example 4 | No change |
| Example 5 | No change |
| Example 6 | Light yellow |
| Example 7 | Light yellow |
| Example 8 | Light yellow |
| Example 9 | Yellow |
| Example 10 | Yellow |
| Example 11 | No change |
| Example 12 | No change |
| Example 13 | No change |
| Example 14 | No change |
| Example 15 | Yellow |
| Example 16 | No change |
| Example 17 | No change |
| Example 18 | No change |
| Contrast Example 1 | Black |
| Contrast Example 2 | Black |
| Contrast Example 3 | Brown |
| Contrast Example 4 | No change |
| Contrast Example 5 | No change |

As will be understood from the Table 3, Examples 3 to 5, 11 to 14, 16 to 18 have substantially the same thermal stability as Contrast Examples 4 and 5, i.e. the examples in which a tin stabilizer was used. In the example, 1,4-butanediol dye-β-aminocrotonic ester and glycidyl ether or ester of bisphenol A were used in combination as the stabilizer, and it is to be understood that examples provided by this combination are excellent in stability. Examples 2, 6, 7 and 8 are a little inferior in thermal stability to Contrast Examples 4 and 5 but are superior to Contrast Examples 1, 2 and 3. Further, Examples 1, 9, 10 and 15 are superior to Contrast Examples 1, 2 and 3.

(iii) Measurement of general physical properties

Measurement was taken of general physical properties with reference to the test pieces of Examples 3 and 13 and Contrast Example 4. The results are shown in Table 4. Also, measurement was taken of total light transmittancy with reference to the test pieces (Example 5 is 3 mm thick and all the other examples are 10 mm thick) of Examples 3, 11, 12, 13, 14 and 18 and Contrast Examples 4 and 5 and also of heat distortion temperature (18.6 kgf/cm² in load) with reference to the test pieces (10 mm thick) of Examples 3, 13, 15, 16, 17 and 18 and Contrast Examples 4 and 5 in conformity with ASTM-D-648. The results are shown in Tables 5 and 6, respectively.

TABLE 4

| Test piece No. | Item | | | |
|---|---|---|---|---|
| | Charpy test | Tension strength | Bending strength | Modulus of elasticity in bending |
| | Unit | | | |
| | Kgf-cm/cm² | Kgf/cm² | Kgf/cm² | Kgf/cm² |
| Example 3 | 4.0 | 730 | 1,100 | 37,000 |
| Example 13 | 30 | 450 | 650 | 22,000 |
| Contrast example 4 | 4.0 | 750 | 1,200 | 38,000 |

TABLE 5

| Test piece No. | Item Total light transmittancy Unit % |
|---|---|
| Example 3 | 80.3 |
| Example 11 | 6.1 |
| Example 12 | 1.9 |
| Example 13 | 1.0 |
| Example 14 | 7.2 |
| Example 18 | 12.7 |
| Contrast expl. 4 | 80.3 |
| Contrast expl. 5 | 86.8 |

TABLE 6

| Test piece No. | Item Heat distortion temperature Unit °C. |
|---|---|
| Example 3 | 64 |
| Example 13 | 61 |
| Example 15 | 71 |
| Example 16 | 70 |
| Example 17 | 66 |
| Example 18 | 66 |
| Contrast expl. 4 | 62 |
| Contrast expl. 5 | 61 |

As will be understood from the above Table 4, Example 3 shows substantially the same physical properties as Contrast Example 4 and can be used in the same manner as a conventional PVC plate. Example 13 is improved in Charpy test value 7.5 times more than Example 3 or Contrast Example 4 and has characteristic properties as a shockproof PVC plate. Furthermore, as shown in Table 5, the total light transmittancy of Examples 11, 12, 13, 14 and 18 is exceedingly reduced in comparison with that of Example 3 or Contrast Examples 4 and 5 and it is apparent that they can answer the purpose of the uses which require non-light-transmittability. In addition thereto, Table 6 clearly shows that Examples 15, 16, 17 and 18 are about 6° C. higher in heat distortion temperature than Examples 3 and 13 and Contrast Examples 4 and 5 and that there is a difference in the effect which stearic acid and acrylic lubricant have on the heat distortion temperature.

(iv) Aside from the above, the microelements which the test pieces of Examples 3 and 13 and Contrast Example 4 contain were analyzed by an atomic absorptiometry (Sn, Pb) and an ICP emission spectroscopic analysis method (Ca, Zn, Ti, Mg). The results are shown in Table 7.

TABLE 7

| Element contained | Test piece No. | | | Unit: ppm |
|---|---|---|---|---|
| | Example 3 | Example 13 | Contrast example 4 | |
| Sn | 0.9 | 0.9 | 6,700 | |
| Pb | <1 | <1 | <1 | |
| Ca | <0.1 | <0.1 | 0.6 | |
| Zn | 0.2 | 0.2 | <0.2 | |
| Ti | <0.2 | <0.2 | <0.2 | |
| Mg | <0.1 | <0.1 | <0.2 | |

As will be understood from Table 7, little or no metallic element such as Pb and Sn were detected from Examples 3 and 13.

(v) Dissolution Test

The test pieces of Example 3, Contrast Example 4 and Contrast Example 6 which is, independently of Examples 1–18 and Contrast Examples 1–5, made of PVC resin stabilized by a plumbic stabilizer, were immersed in pure water and analyzed by the atomic absorptiometry and ICP emission spectroscopic analysis method in conformity with JIS K 6743. The results are shown in Table 8.

TABLE 8

| Elements dissolved | Unit: ppm ... amount of dissolution against unit volume of pure water Test piece No. | | |
|---|---|---|---|
| | Example 3 | Contrast Example 4 | Contrast Example 6 |
| Sn | 0.00 | 0.02 | 0.00 |
| Pb | 0.00 | 0.00 | 0.39 |
| Ti | 0.00 | 0.00 | 0.00 |
| Ca | 0.00 | 0.00 | 0.00 |

As will be understood from the Table 8, the test piece of Example 3 was immersed in pure water but no metallic ion was detected from the water. From the solution in which Contrast Examples 4 and 6 were immersed, plumbum or tin contained in their stabilizer was observed.

Substantially the same results were obtained from the same test made on the PVC resin molding in which other stabilizers than those in the examples were used. In addition, coloring agents imparting non-light-transmittability to the molding other than a denatured acryl modifier and an ethylene vinyl acetate copolymer were used in a single or a suitable combination from those coloring agents aforestated to obtain substantially the same light-transmittability. The following is one of recommendable manners of use of the resin molding according to the invention, i.e., when the molding of the invention is brought into a sheet shape so as to be laminated over the surface of an ordinary PVC resin molding, the same result as above can be expected on the surface of the molding so that molding may be improved of its surface property with the characteristics of the sheet according to the invention keeping a comparative low cost for the portion other than the sheet. Hence this manner of application is recommended, depending upon purposes of use. Further, instead of the PVC resin molding, the use of chlorinated vinyl resin molding improves thermal deformation temperature to a degree of about 100° C., while the use of ethylenated vinyl chloride resin molding and that of a polymeric alloy improve shock resistance and secondary processing property, respectively.

As described above, since the chlorine-containing resin molding of the invention contains no such metallic compound as plumbum and tin as has conventionally been the case with a stabilizer for chlorine-containing resin moldings, there is not only no possibility of metallic element ion dissolving from the resin molding used with apparatuses and appliances related with semiconductors, biochemistry, medical treatment, food stuffs and pharmaceuticals, but also the resin molding of the invention is very suitably used with the apparatuses and appliances described above because the resin molding keeps inherent chracteristics of the chlorine-containing resin being inexpensive, strong and excellent in resistance to chemicals and pharmaceuticals and in secondary processing property. Further, since the molding is given thermal stability by the stabilizer, it does not turn black even by rise in temperature during molding but keeps its inherent appearance. Further, in addition to the characteristics of metallic ion not dissolving from the molding, the molding is given lubrication by the acrylic lubricant, with the result that it is not only excellent in moldability and appearance but is also free from such a decrease in thermal deformation temperature as is conventionally the case with a higher fatty acid and increases proper application of the resin to the uses described above. Moreover, addition to the resin of a coloring agent which contains no metallic element and which imparts non-light-transmittability to the moldings makes the resulting products translucent or opaque, and accordingly, it is very suitable also for the uses wherein it is not necessary to make the moldings seen therethrough or wherein it is desired to eliminate optical effect.

Still further the chlorine-containing resin molding material of the invention is exceedingly suitable for obtaining the molding of the kind described above and finds highly useful applicability for uses related with semiconductors.

We claim:

1. An opaque chlorine-containing resin for molding, the improvement comprising that the resin for said molding is stabilized by aminocarboxylic ester and an epoxy compound and contains as a coloring agent a denatured acryl modifier which contains no metallic ion, said denatured acryl modifier being selected from the group consisting of a copolymer of methymethacrylate with acrylic ester, a polymer of methylmethacrylate after copolymerization of styrene with alkylacrylate, a copolymer of styrene with acrylacrylate after polymerization of methylmethacrylate, and a polymer obtained after polymerization of methylmethacrylate, thereafter polymerization of styrene with alkylacrylate and finally further polymerization of methylmethacrylate.

2. A chlorine-containing resin for molding according to claim 1, wherein said aminocarboxylic ester is β-aminocrotonic ester.

3. An opaque chlorine-containing resin for molding, the improvement comprising that the resin for said molding is stabilized by aminocarboxylic ester and an epoxy compound and contains as a coloring agent a denatured acryl modifier which contains no metallic ion, said denatured acryl modifier being selected from the group consisting of a copolymer of methylmethacrylate with acrylic ester, a polymer of methylmethacrylate after copolymerization of styrene with alkylacrylate, a copolymer of styrene with acrylacrylate after polymerization of methylmethacrylate, and a polymer obtained after polymerization of methylmethacrylate, thereafter polymerization of styrene with alkylacrylate and finally further polymerization of methylmethacrylate.

4. A chlorine-containing resin for molding according to claim 3, wherein said aminocarboxylic ester is β-aminocrotonic acid ester.

5. An opaque chlorine-containing resin for molding, the improvement comprising that the resin for said molding is stabilized by aminocarboxylic ester and an epoxy compound and that it contains acrylic lubricant and that it contains as a coloring agent a denatured acryl modifier which contains no metallic ion, said denatured acryl modifier being selected from the group consisting of a copolymer of methylmethacrylate with acrylic ester, a polymer of methylmethacrylate after copolymerization of styrene with alkylacrylate, a copolymer of styrene with acrylacrylate after polymerization of methylmethacrylate, and a polymer obtained after polymerization of methylmethacrylate, thereafter polymerization of styrene with alkylacrylate and finally further polymerization of methylmethacrylate.

6. A chlorine-containing resin for molding according to claim 5, wherein said aminocarboxylic ester is β-aminocrotonic acid ester.

7. An opaque chlorine-containing resin molding material consisting of 100 parts by weight of chlorine-containing resin, 0.5–5.0 parts by weight of aminocarboxylic ester, and 0.5–5.0 parts by weight of epoxy compound as stabilizers and 0.01–50 parts by weight of a denatured acryl modifier which contains no metallic ion, said denatured acryl modifier being selected from the group consisting of a copolymer of methylmethacrylate with acrylic ester, a polymer of methylmethacrylate after copolymerization of styrene with alkylacrylate, a copolymer of styrene with acrylacrylate after polymerization of methylmethacrylate, and a polymer obtained after polymerization of methylmethacrylate, thereafter polymerization of styrene with alkylacrylate and finally further polymerization of methylmethacrylate.

8. A chlorine-containing resin for molding according to claim 7, wherein said aminocarboxylic ester is aminocrotonic ester.

* * * * *